(12) United States Patent
Kato

(10) Patent No.: US 7,995,087 B2
(45) Date of Patent: Aug. 9, 2011

(54) OPTICAL SCANNER

(75) Inventor: Ryota Kato, Aichi (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 61 days.

(21) Appl. No.: 12/256,540

(22) Filed: Oct. 23, 2008

(65) Prior Publication Data

US 2009/0109273 A1 Apr. 30, 2009

(30) Foreign Application Priority Data

Oct. 24, 2007 (JP) ................................. 2007-275935

(51) Int. Cl.
*B41J 15/08* (2006.01)
*B41J 2/447* (2006.01)

(52) U.S. Cl. ......... 347/241; 347/243; 347/245; 347/261

(58) Field of Classification Search .................. 347/245
See application file for complete search history.

(56) References Cited

U.S. PATENT DOCUMENTS

| 4,760,424 A * | 7/1988 | Ohba et al. .................. 399/113 |
| 5,444,520 A * | 8/1995 | Murano ....................... 399/221 |
| 6,339,491 B1 * | 1/2002 | Kondou et al. .............. 359/212.1 |
| 6,977,780 B2 | 12/2005 | Matsumoto et al. |
| 7,226,175 B2 | 6/2007 | Matsumoto et al. |
| 7,760,225 B2 * | 7/2010 | Yoshizawa et al. ........... 347/242 |
| 2004/0100673 A1 * | 5/2004 | Sakai et al. .................... 359/216 |
| 2005/0174418 A1 * | 8/2005 | Sakaue et al. ................. 347/112 |
| 2007/0002415 A1 | 1/2007 | Kato et al. |

FOREIGN PATENT DOCUMENTS

| JP | 2002-131670 | 5/2002 |
| JP | 2003-195209 | 7/2003 |
| JP | 2007-011015 | 1/2007 |

* cited by examiner

*Primary Examiner* — Omar Rojas
(74) *Attorney, Agent, or Firm* — Banner & Witcoff, Ltd.

(57) ABSTRACT

An optical scanner forms an electrostatic latent image on a photosensitive member by scanning the photosensitive member with a light beam. The optical scanner includes: an incident optical system which at least comprises: a light beam emission device configured to emit a light beam; and a cylindrical lens configured to condense the light beam emitted from the light beam emission device, and a scanning optical system which at least comprises: a light deflecting device configured to reflect the light beam having passed through the cylindrical lens to deflect the light beam in a main scanning direction for scanning the photosensitive member; and a scanning lens configured to focus the light beam deflected by the light deflecting device on the photosensitive member to form an electrostatic latent image thereon. The incident optical system and the scanning optical system are divided by a light shielding wall.

5 Claims, 5 Drawing Sheets

OPTICAL SCANNER

CROSS REFERENCE TO RELATED APPLICATIONS

This application claims the foreign priority benefit under Title 35, United States Code, §119(a)-(d) of Japanese Patent Application No. 2007-275935 filed on Oct. 24, 2007 in the Japan Patent Office, the disclosure of which is herein incorporated by reference in its entirety.

BACKGROUND OF THE INVENTION

The present invention relates to an optical scanner configured to scan a photosensitive member with a light beam to form an electrostatic latent image on the photosensitive member.

Generally, an optical scanner used for a laser printer has various optical elements, such as a semiconductor laser, a coupling lens, a reflecting mirror, and a cylindrical lens which constitute an incident optical system, and a deflecting mirror, a scanning lens, and a reflecting mirror which constitute a scanning optical system. Of these optical elements, a lens produces stray light when a light beam is reflected on its incidence surface and emission surface. If the stray light reaches a photosensitive member, a ghost image may be formed, thereby leading to deteriorated image quality. Particularly, in the case where stray light occurs in the incident optical system and reaches the photosensitive member, only little stray light becomes a problem because the optical path of the stray light beam is unchanged and the photosensitive member is continuously irradiated with the stray light at the same area.

To eliminate this problem, for example, Japanese Laid-open Patent Publication No. 2003-195209 discloses an image exposure device including a limiter such as a light filter and a half mirror on an optical path of light beam emitted from a laser beam source (semiconductor laser) that emits a large amount of stray light. Because the limiter limits the amount of light emitted from the laser beam source to the required amount for exposure, this image exposure device can restrict stray light from the laser beam source.

However, in this conventional image exposure device, a laser beam from the laser beam source goes around the limiter and can be incident on the reflecting mirror and the cylindrical lens that is arranged on an optical path adjacent thereto. This conventional image exposure device is therefore insufficient to restrict stray light generated in the incident optical system from reaching the photosensitive member. Further, this image exposure device is much less sufficient to restrict stray light caused by a laser beam from another laser beam source.

In view of the foregoing drawbacks of the prior art, the present invention seeks to provide an optical scanner which can sufficiently restrict stray light generated in an incident optical system from reaching a photosensitive member.

SUMMARY OF THE INVENTION

According to the present invention, there is provided an optical scanner for forming an electrostatic latent image on a photosensitive member by scanning the photosensitive member with a light beam, the optical scanner comprising: an incident optical system including: a light beam emission device configured to emit a light beam; and a cylindrical lens configured to condense the light beam emitted from the light beam emission device, and a scanning optical system including: a light deflecting device configured to reflect the light beam having passed through the cylindrical lens to deflect the light beam in a main scanning direction for scanning the photosensitive member; and a scanning lens configured to focus the light beam deflected by the light deflecting device on the photosensitive member to form an electrostatic latent image thereon. The incident optical system and the scanning optical system are divided by a light shielding wall.

With this configuration of the aforementioned optical scanner, the light shielding wall divides the incident optical system including the light beam emission device and the cylindrical lens from the scanning optical system including the light deflecting device and the scanning lens. Therefore, it is possible to divide the incident optical system from the photosensitive member that is arranged downstream from the scanning optical system in a travelling direction of the light beam.

Preferably, the light shielding wall is at least higher than an optical axis of the light beam that is emitted from the incident optical system. More preferably, the light shielding wall has a height to completely partition the incident optical system and the scanning optical system, for example, by extending to the ceiling of a casing for accommodating the incident optical system and the scanning optical system. Further, in the case where a gap is formed between the light shielding wall and the casing, it is further preferable that the gap is closed by a sponge member.

According to the present invention, because the light shielding wall divides the incident optical system from the photosensitive member that is arranged downstream from the scanning optical system in the travelling direction of the light beam, it is possible to sufficiently restrict stray light generated in the incident optical system from reaching the photosensitive member.

BRIEF DESCRIPTION OF THE DRAWINGS

Other objects and aspects of the present invention will become more apparent by describing in detail illustrative, non-limiting embodiments thereof with reference to the accompanying drawings, in which.

DETAILED DESCRIPTION OF THE INVENTION

Structure of Laser Printer

One preferred embodiment of the present invention will be described in detail with reference to the attached drawings.

Firstly, the overall structure of a color laser printer will be described with reference to FIG. 1.

In the following description, unless otherwise stated, directions of the color laser printer refer to the directions as seen from a user facing the color laser printer during its use. To be more specific, referring to FIG. 1, a left-side direction and a right-side direction of the color laser printer are referred to as a "front or near side" and a "rear or far side", respectively.

Figure 1:
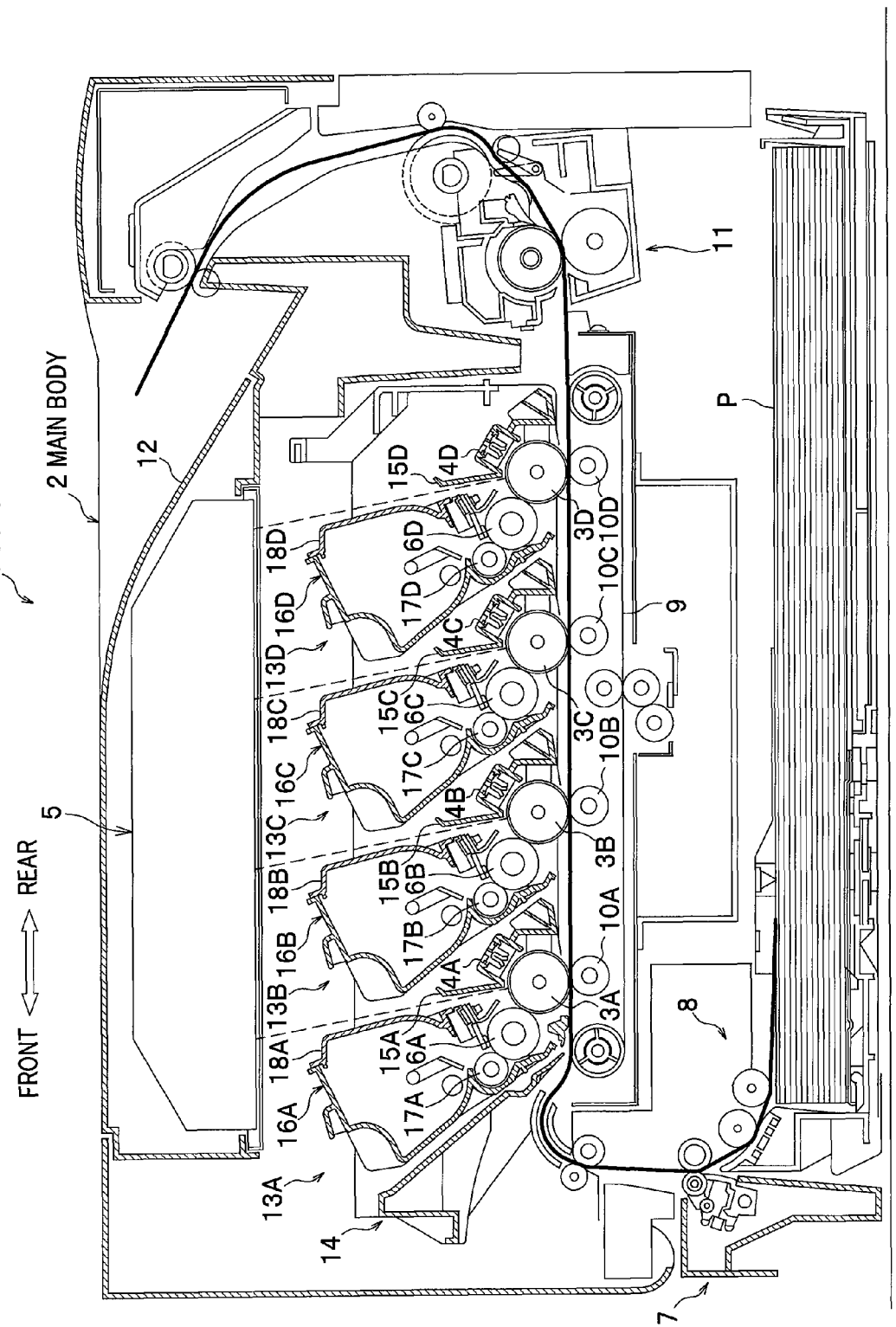
FIG. 1 is a sectional view illustrating the overall structure of a color laser printer as an embodiment of an image forming apparatus.

Also, a direction away from a viewer of FIG. 1 is referred to as a "left side", and a direction toward the viewer of FIG. 1 as a "right side". An upper and lower direction in FIG. 1 is referred to as a "vertical direction" or an "upper and lower direction" as it is.

As seen in FIG. 1, the color laser printer 1 has four photosensitive drums 3A-3D as an example of a plurality of photosensitive members. The photosensitive drums 3A-3D are arranged parallel in a main body 2 in a near-to-far direction (hereinafter referred to as a "front-back direction". A surface of each photosensitive drum 3A-3D is uniformly charged by a Scorotron charger 4A-4D, and thereafter an optical scanner 5 scans the surface of the photosensitive drum 3A-3D with a laser beam (light beam) to form an electrostatic latent image on the photosensitive drum 3A-3D based on an image data. The electrostatic latent image becomes a visible image on each photosensitive drum 3A-3D when toner (developer) is supplied from a corresponding development roller 6A-6D carrying the toner, so that a toner image is formed on the photosensitive drum 3A-3D.

A stack of paper (or sheets) P is stored in a sheet cassette 7 that is received in the main body 2. Paper P passes through various rollers provided in the sheet feeding unit 8 and a feeding direction of the paper P is changed from the near side to the far side, so that the paper P is transferred from the sheet cassette 7 to a conveyor belt 9. The conveyor belt 9 is positioned opposite to the photosensitive drums 3A-3D. Different colored toner on the photosensitive drum 3A-3D is transferred one after another onto the paper P that is conveyed on the conveyor belt 9 along a paper conveyance passage while a transfer bias is being applied to the transfer rollers 10A-10D. After toner images for four different colors are transferred from the photosensitive drums 3A-3D onto the paper P to form a complete toner image, the paper P is conveyed to a fixing device 11 at which the toner image is thermally fixed on the paper P. The paper P then passes through various rollers, so that the feeding direction of the paper P is changed from the far side to the near side and the paper P is discharged and stacked on a sheet output tray 12.

Four process cartridges 13A-13D are provided in the main body 2 between the sheet cassette 7 and the optical scanner 5. These process cartridges 13A-13D are arranged in line in the main body 2 along the front-back direction. The process cartridges 13A-13D are detachably mounted to a frame 14 that is also detachably mounted to the main body 2. The process cartridges 13A-13D are thus arranged in predetermined positions in the main body 2 while being attached to the frame 14.

Each process cartridge 13A-13D mainly includes a casing 15A-15D forming an outer frame, the photosensitive drum 3A-3D, the Scorotron charger 4A-4D, and a developer cartridge 16A-16D that is detachably mounted to the corresponding casing 15A-15D. Further, the developer cartridge 16A-16D mainly includes the development roller 6A-6D, a feed roller 17A-17D, and a toner hopper 18A-18D. The process cartridges 13A-13D have substantially the same construction except that the color of toner stocked in the toner hopper 18A-18D of the developer cartridge 16A-16D is different from those of the other process cartridges 13A-13D.

Overall Structure of Optical Scanner

Detailed description will be given of the structure of the optical scanner 5.

Figure 2:
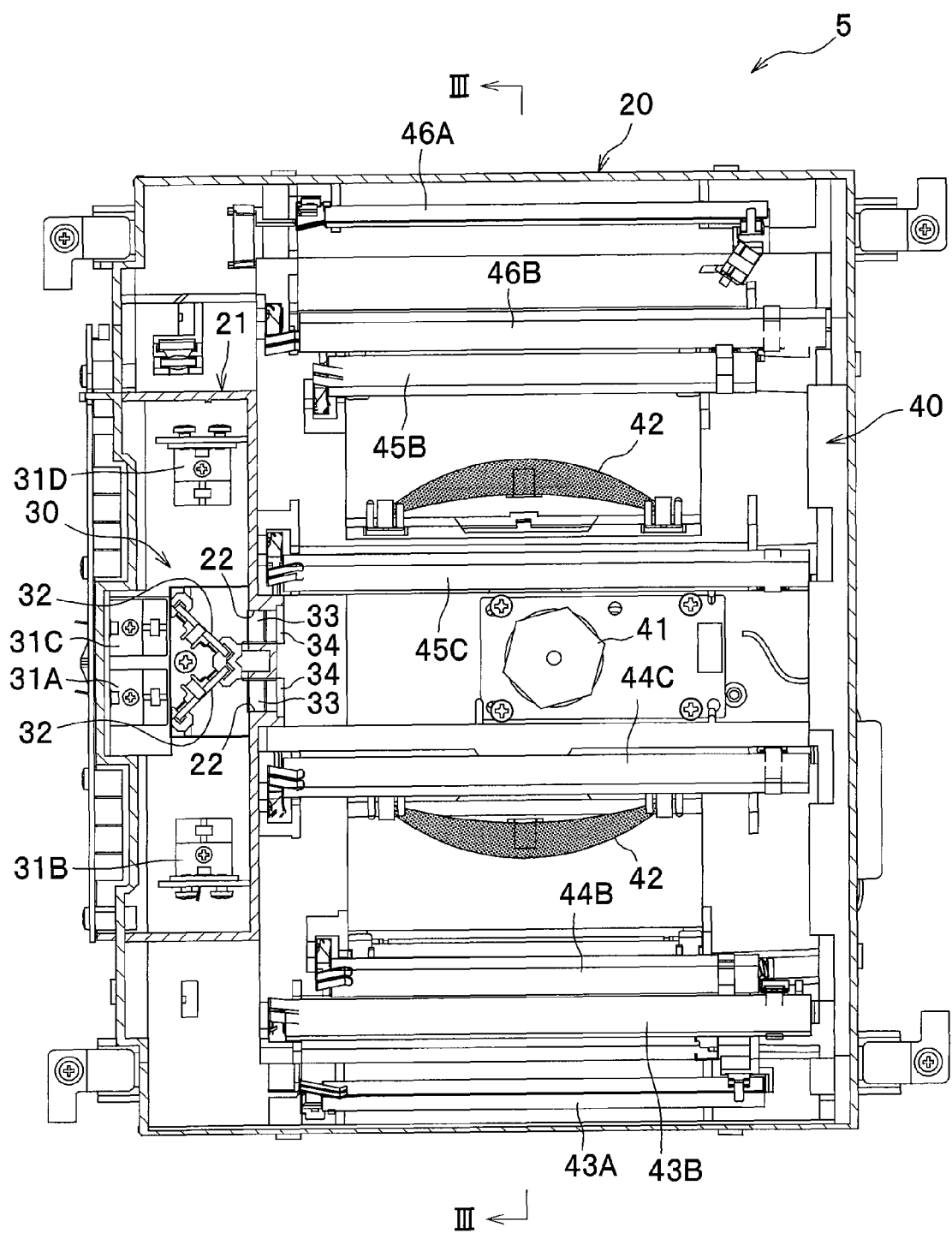
FIG. 2 is a plan view illustrating the configuration of an optical scanner according to one preferred embodiment of the present invention.

As seen in FIG. 2, the optical scanner 5 mainly consists of an incident optical system 30 and a scanning optical system 40, which is positioned in a hollow casing 20. The incident optical system 30 and the scanning optical system 40 are divided in the casing 20 by a light shielding wall 21 that is integrally formed with the casing 20. To be more specific, the light shielding wall 21 is integrally formed with a bottom wall, a side wall (left-side side wall of FIG. 2), and a ceiling or top wall (not shown) of the casing 20, so that the internal space of the casing 20 is completely divided by the light shielding wall 21 into two spaces. The incident optical system 30 is positioned in one of the two spaces, while the scanning optical system 40 is positioned in the other space of the casing 20.

Two openings 22 are formed in the light shielding wall 21 for allowing laser beams (light beams) emitted from the incident optical system 30 to pass through the openings 22. In other words, the light shielding wall 21 according to the present invention has only two openings 22 for allowing the laser beams to pass through the light shielding wall 21. Namely, except for the openings 22, the incident optical system 30 is absolutely isolated from the scanning optical system 40 in the casing 20. An aperture member 34 to be described later is fixed at a laser beam emission side of the opening 22.

The integrally formed casing 20 and light shielding wall 21 or at least the light shielding wall 21 is made of resin, which blocks transmission of a laser beam emitted from a semiconductor laser 35 (see FIG. 4) and having a specific wavelength: for example, resin of which transmissivity is equal to or less than 10%. The light shielding wall 21 may be made of resin having a lower transmissivity at a wavelength around 780 nm, so that the light shielding wall 21 can restrict transmission of near-infrared light.

Figure 3:
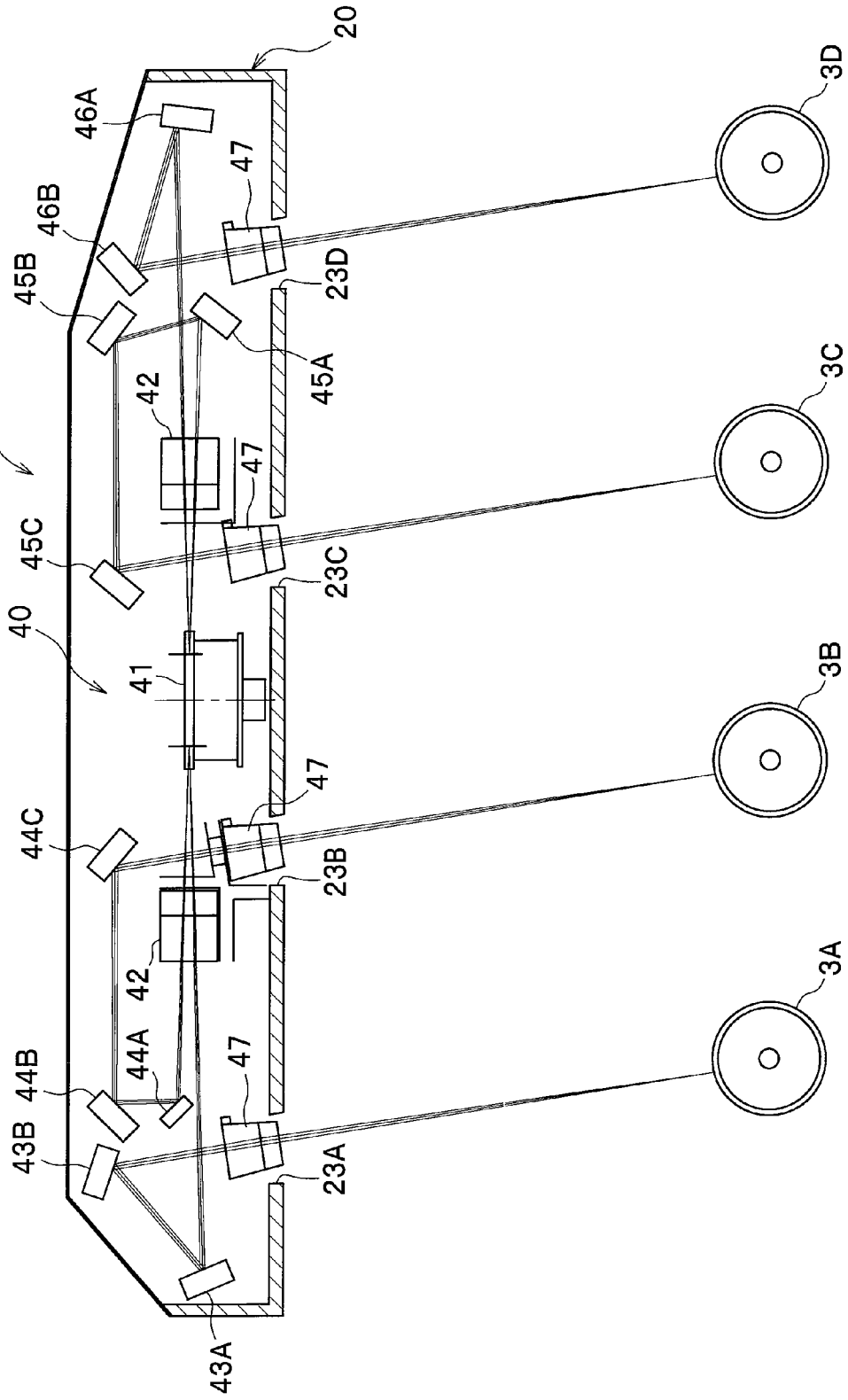
FIG. 3 is a sectional view taken along the line III-III of FIG. 2.

As shown in FIG. 3, a plurality of openings 23, that is, four openings 23A-23D are formed in the bottom portion of the casing 20. A plurality of laser beams (light beams) that are emitted from the incident optical system 30 and then deflected in the scanning optical system 40 pass through the openings 23A-23D so that each of the plurality of light beams is directed to the surfaces of different photosensitive drums 3A-3D for scanning the photosensitive drums 3A-3D. The incident optical system 30 and the scanning optical system 40 will be described in detail.

Structure of Incident Optical System

As seen in FIG. 2, the incident optical system 30 mainly includes four laser beam sources 31 (31A-31D) as an example of a plurality of light beam emission devices, two reflecting mirrors 32, two cylindrical lenses 33, and two aperture members 34.

In the following description, an upstream side and a downstream side of a travelling direction of the laser beam that is emitted from the laser beam source 31 will be simply referred to as an "upstream side" and a "downstream side".

Figure 4:
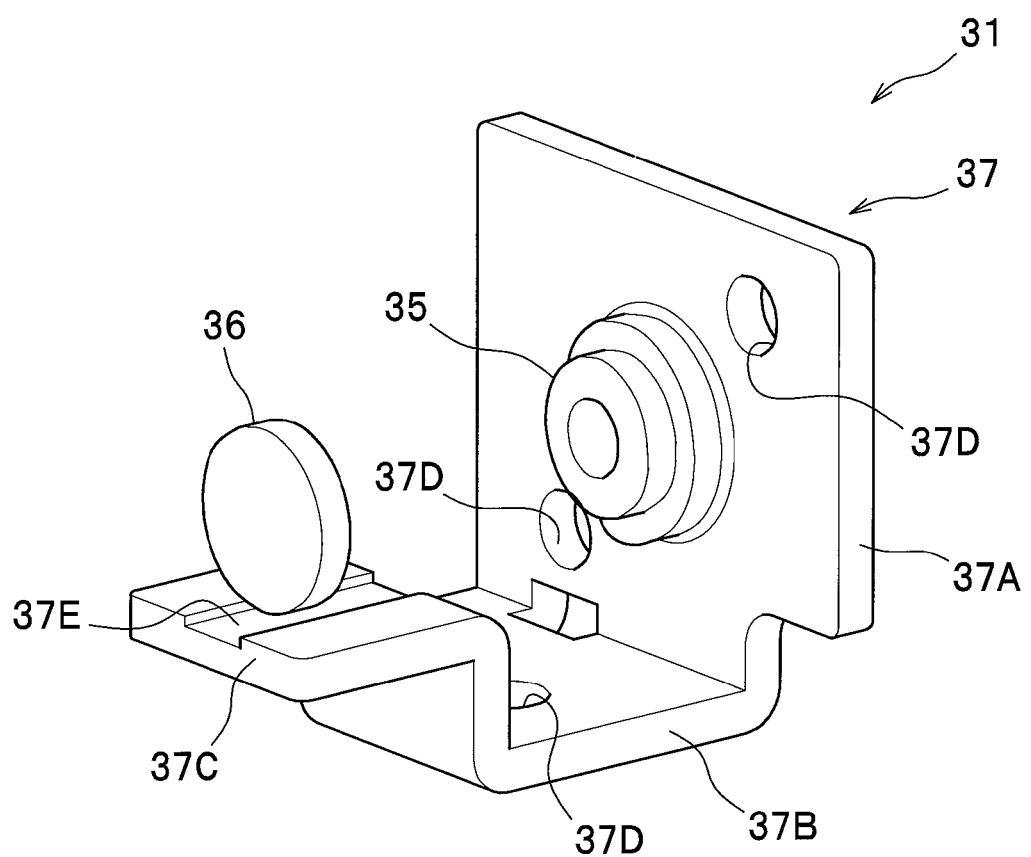
FIG. 4 is a perspective view illustrating the configuration of a laser beam source of the optical scanner as shown in FIG. 2.

As best seen in FIG. 4, the laser beam source 31 includes a semiconductor laser 35 as an example of a light emitting element, a coupling lens 36, and a holder 37. The four laser beam sources 31A-31D have substantially the same construction.

The coupling lens 36 is a convex lens which is made of resin or glass. The coupling lens 36 condenses the laser beam emitted from the semiconductor laser 35 and converts it into a light beam (collimated light beam).

The holder 37 is formed by sheet metal working of a plate member that is made of aluminum alloy. The holder 37 consists of a laser retaining wall 37A, a bottom wall 37B extending downstream from the lower end of the laser retaining wall 37A, a connecting portion extending upward from the downstream end of the bottom wall 37B, and a lens retaining portion 37C extending downstream from the upper end of the connecting portion.

A through hole is formed in the laser retaining wall 37A so that the semiconductor laser 35 is press fitted into the through hole. Attachment holes 37D are formed in the laser retaining wall 37A and the bottom wall 37B. The holder 37 is fixed to the casing 20 or fixing portions provided in the casing 20 by screws (see FIG. 2).

The lens retaining portion 37C has a groove 37E extending along the travelling direction of the laser beam. The coupling lens 36 is bonded in the groove 37E at a predetermined position distanced away from the semiconductor laser 35. In this embodiment, a passage from the semiconductor laser 35 to the coupling lens 36 is open without being covered by a lens-barrel.

As best seen in FIG. 2, the laser beam source 31A and the laser beam source 31B are arranged such that their optical paths of the emitted laser beams intersect orthogonally to each other. To be more specific, the laser beam source 31A is arranged opposite to a polygon mirror 41 to be described later, and the laser beam source 31B is arranged such that the optical path of the laser beam emitted therefrom is substantially orthogonal to the line connecting the laser beam source 31A and the polygon mirror 41. The laser beam sources 31C and 31D are arranged symmetrically to the laser beam sources 31A, 31B.

Figure 5:
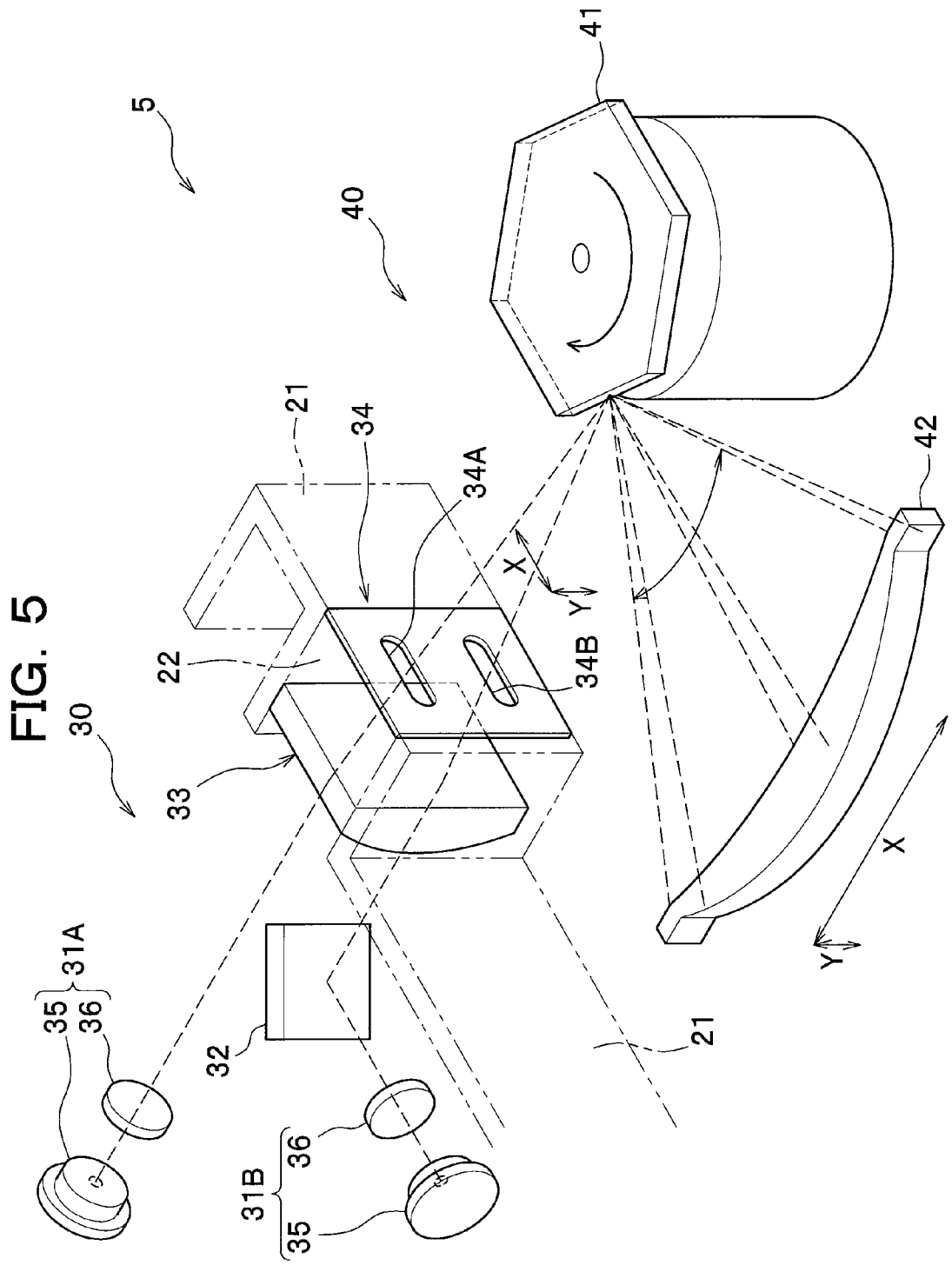
FIG. 5 is a perspective view illustrating optical paths of the optical scanner.

The reflecting mirror 32 is arranged downstream of the laser beam source 31A (or 31C) in such a position as to tilt at approximately 45 degrees with respect to the optical paths of the laser beams emitted from the laser beam sources 31A, 31B (or the laser beam sources 31C, 31D). As best seen in FIG. 5, the reflecting mirror 32 deflects the laser beam from the laser beam source 31B at approximately 90 degrees so that the direction of the laser beam from the laser beam source 31B is changed to substantially align with that of the laser beam from the laser beam source 31A. The laser beam from the laser beam source 31A passes above the reflecting mirror 32.

The cylindrical lens 33 is positioned downstream from the reflecting mirror 32 and arranged in the opening 22 formed in the light shielding wall 21 at the laser beam incident side thereof. In order to correct optical face tangle errors of the polygon mirror 41, the cylindrical lens 33 refracts the laser beams from the laser beam sources 31A, 31B (or the laser beam sources 31C, 31D) such that these laser beams are converged in the subscanning direction Y (see FIG. 5) and focused on the polygon mirror 41. The cylindrical lens 33 is made of resin or glass, and has a convex surface at a beam-incident side and a flat surface at a beam-emitting side.

The aperture member 34 is made of a substantially rectangular plate member (sheet metal). The aperture member 34 is positioned downstream from the cylindrical lens 33 and fixed at a laser beam emission side of the opening 22. As best seen in FIG. 5, the aperture member 34 has two aperture slits 34A, 34B as an example of an optical aperture. These aperture slits 34A, 34B are lined in the subscanning direction Y at an interval corresponding to the optical paths of the laser beam sources 31A, 31B (or the laser beam sources 31C, 31D). Each of the aperture slits 34A, 34B is in the shape of an oblong opening extending in the main scanning direction X. When the laser beam from the cylindrical lens 33 passes through the aperture slit 34A or the aperture slit 34B of the aperture member 34, the laser beam is limited to have predetermined widths in the main scanning direction X and the subscanning direction Y. Therefore, each of the aperture slits 34A, 34B functions as an optical aperture.

Providing the aperture member 34 in the opening 22 of the light shielding wall 21 can improve a light shielding property because the light shielding wall 21 allows transmission of the laser beam only through the aperture slits 34A, 34B.

Structure of Scanning Optical System

As seen in FIGS. 2 and 3, the scanning optical system 40 mainly includes the polygon mirror 41 as an example of a light deflecting device, two scanning lenses 42 positioned on both sides of the polygon mirror 41 (i.e., the polygon mirror 41 is interposed between the scanning lenses 42), a plurality of reflecting mirrors 43-46, and four toroidal lenses 47.

The polygon mirror 41 is arranged downstream from the incident optical system 30 and the aperture member 34 and is positioned substantially at a center of the scanning optical system 40 (also at a center of the casing 20). The polygon mirror 41 has a hexagonal cross-section and each of the six sides is provided with a reflecting mirror. As best seen in FIG. 5, the polygon mirror 41 spins at a high speed to reflect the laser beams on the reflecting mirrors so that the laser beams passing through the aperture slits 34A, 34B of the aperture member 34 are deflected in the main scanning direction Y for scanning the photosensitive drums 3A-3D. The laser beams emitted from the incident optical system 30 are incident on a reflecting mirror of the polygon mirror 41 at different incident angles, and therefore the laser beams are reflected by the reflecting mirror at different angles in the subscanning direction Y.

The scanning lenses 42 are arranged downstream from the polygon mirror 41. The scanning lenses 42 convert the laser beams deflected at an equiangular speed by the polygon mirror 41 into beams for scanning the photosensitive drums 3A-3D at a constant speed. As seen in FIG. 3, of the two laser beams passing through one scanning lens 42 (the scanning lens 42 positioned on the left side of FIG. 3), the lower laser beam is reflected by the reflecting mirror 43A and the reflecting mirror 43B so that the travelling direction of the laser beam is changed, and thereafter the laser beam passes through the toroidal lens 47 and then through the opening 23A. The laser beam coming from the opening 23A is directed to and focused on the photosensitive drum 3A for scanning the photosensitive drum 3A. Meanwhile, the upper laser beam of the two laser beams is reflected in turn by the reflecting mirrors 44A, 44B, and 44C so that the travelling direction of the laser beam is changed, and thereafter the laser beam passes through the toroidal lens 47 and then through the opening 23B. The laser beam coming from the opening 23B is directed to and focused on the photosensitive drum 3B for scanning the photosensitive drum 3B.

Similarly, of the two laser beams passing through the other scanning lens 42 (the scanning lens 42 positioned on the right side of FIG. 3), the lower laser beam is reflected in turn by the reflecting mirrors 45A, 45B, and 45C so that the travelling direction of the laser beam is changed, and thereafter the laser beam passes through the toroidal lens 47 and then through the opening 23C. The laser beam coming from the opening 23C is directed to and focused on the photosensitive drum 3C for scanning the photosensitive drum 3C. Meanwhile, the upper laser beam of the two laser beams is reflected by the reflecting mirror 46A and the reflecting mirror 46B so that the travelling direction of the laser beam is changed, and thereafter the laser beam passes through the toroidal lens 47 and then through the opening 23D. The laser beam coming from the opening 23D is directed to and focused on the photosensitive drum 3D for scanning the photosensitive drum 3D.

The operation of the optical scanner 5 as constructed above will be described below.

As shown in FIG. 5, the laser beam emitted from the semiconductor laser 35 is partly reflected by the incidence surface and the emission surface of the coupling lens 36 and the cylindrical lens 33 and becomes stray light. Particularly, in the case where a plurality of laser beam sources 31 are employed as with this embodiment, the numbers of semiconductor lasers 35, coupling lenses 36, and cylindrical lenses 33 are increased, so that an extremely large amount of stray light is generated.

Further, the laser beam emitted from the semiconductor laser 35 gradually extends from its point of emission. Especially in the case of this embodiment where the passage from the semiconductor laser 35 to the coupling lens 36 is open without being covered by a lens-barrel, part of the laser beam emitted from the semiconductor laser 35 does not go into the coupling lens 36 and becomes stray light.

The extremely large amount of stray light generated as above can be shielded by the light shielding wall 21, so that little or no stray light goes into the scanning optical system 40. According to this embodiment, the laser beams emitted from the incident optical system 30 to the scanning optical system 40 are only allowed to pass through the aperture slits 34A, 34B of the aperture member 34 that is fixed in the opening 22 of the light shielding wall 21. Therefore, the area of the opening of the light shielding wall 21 can be minimized to limit the amount of stray light going into the scanning optical system 40. Further, according to this embodiment, because the light shielding wall 21 is integrally formed with the casing 20, no gap is formed between the casing 20 and the light shielding wall 21. This can restrict stray light from passing through gaps between the casing 20 and the light shielding wall 21 and going into the scanning optical system 40.

Stray light shielded and blocked by the light shielding wall 21 is reflected by the light shielding wall 21 and the walls of the casing 20, and is gradually absorbed and removed. In this embodiment, the casing 20 and the light shielding wall 21 are made of resin which blocks transmission of the laser beam emitted from the semiconductor laser 35 and having a specific wavelength. This can prevent stray light from transmitting through the light shielding wall 21 and going into the scanning optical system 40.

As in the case of a so-called tandem color laser printer, a plurality of reflecting mirrors 43-46 are arranged in a complex manner and a plurality of openings 23 are formed as beam-emitting openings, so that stray light generated in the incident optical system 30 is more likely to reach the photosensitive drums 3A-3D. However, as described above, in the optical scanner 5 according to this embodiment, stray light generated in the incident optical system 30 hardly reaches the photosensitive drums 3A-3D.

According to this embodiment, all the components making up the incident optical system 30 are arranged in one side of the light shielding wall 21 that partitions the casing 20, and therefore stray light generated in the incident optical system 30 is reliably blocked by the light shielding wall 21 so as not to reach the photosensitive drums 3A-3D. This can restrict a formation of a ghost image that would otherwise occur if the photosensitive drums 3A-3D were continuously irradiated with stray light at the same area, thereby leading to improved image quality.

Further, because a plurality of laser beam sources 31 are put together in a space of the casing 20 that is partitioned by the light shielding wall 21, it is possible to simplify the construction of the casing 20. This can reduce the cost and the size of the optical scanner 5. Further, because the passage from the semiconductor laser 35 to the coupling lens 36 is open, it is possible to reduce the cost and the size of the laser beam source 31 as well as to improve the degree of freedom for adjustment of the distance between the semiconductor laser 35 and the coupling lens 36. Further, because the casing 20 and the light shielding wall 21 are integrally formed, the light shielding wall 21 functions as a reinforcement member to improve the strength of the casing 20.

Although the present invention has been described in detail with reference to the above preferred embodiment, the present invention is not limited to this specific embodiment and various changes and modifications may be made without departing from the scope of the appended claims.

According to the above embodiment, the internal space of the casing 20 is completely divided by the light shielding wall 21. However, the present invention is not limited to this specific construction. As long as stray light generated in the incident optical system 30 does not go into the scanning optical system 40, a gap may be formed between the light shielding wall (e.g., the upper end of the light shielding wall) 21 and the casing 20.

According to the above embodiment, the cylindrical lens 33 is arranged in the opening 22 formed in the light shielding wall 21 at the laser beam incident side of the opening 22. However, the present invention is not limited to this specific construction and the cylindrical lens 33 may be arranged between the reflecting mirror 32 and the light shielding wall 21.

According to the above embodiment, the aperture slits 34A, 34B of the aperture member 34 fixed in the opening 22 are used as an example of an optical aperture. However, an optical aperture may be formed directly in the light shielding wall 21.

According to the above embodiment, the laser beam source 31 as an example of a light beam emission device is configured such that the passage from the semiconductor laser 35 to the coupling lens 36 is open. However, the present invention is not limited to this specific construction. For example, the passage from the semiconductor laser 35 to the coupling lens 36 may be covered by a lens-barrel.

According to the above embodiment, the light shielding wall 21 is integrally formed with the casing 20. However, the casing 20 and the light shielding wall 21 may be formed as discrete members and assembled together.

Further, according to the above embodiment, the light shielding wall 21 is made of resin. However, the present invention is not limited to this specific construction, and the light shielding wall 21 may be made of metal. Providing a metallic light shielding wall can effectively restrict transmission of stray light. In particular, even if near-infrared light is used as a light beam, the transmissivity of the light beam becomes almost zero. In the case where the light shielding wall 21 is made of metal, it is preferable that the surface of the light shielding wall 21 is colored, for example, with black. This can restrict reflection of the light beam.

According to the above embodiment, the polygon mirror 41 is used as an example of a light deflecting device and the semiconductor laser 35 is used as an example of a light emitting element. However, the present invention is not limited to this specific construction. Materials or configuration may be modified without departing from the scope of the present invention. For example, a galvano mirror (vibrating mirror) may be used as a light deflecting device.

What is claimed is:

1. An optical scanner for forming an electrostatic latent image on a photosensitive member by scanning the photosensitive member with a light beam, the optical scanner comprising:

an incident optical system including: a light beam emission device configured to emit a light beam; and a cylindrical lens configured to condense the light beam emitted from the light beam emission device, and a scanning optical system including: a light deflecting device configured to reflect the light beam having passed through the cylindrical lens to deflect the light beam in a main scanning direction for scanning the photosensitive member; and a scanning lens configured to focus the light beam deflected by the light deflecting device on the photosensitive member to form an electrostatic latent image thereon;

the incident optical system further including: a plurality of the light beam emission devices, wherein the incident optical system and the scanning optical system are divided by a light shielding wall having an optical aperture through which the incident optical system is in communication with the scanning optical system, wherein the light shielding wall allows transmission of the light beam only through the optical aperture, wherein a plurality of optical apertures are formed in the light shielding wall, wherein the optical scanner further including: a casing for accommodating therein the incident optical system and the scanning optical system, and the casing having a plurality of openings which are configured to allow a plurality of light beams emitted from the incident optical system to the scanning optical system to pass through the openings to an outside of the casing so that each of the plurality of light beams is directed to different photosensitive members, and wherein the light beam emission device includes a light emitter element for emitting a laser light, and a coupling lens for converting the laser light emitted from the light emitting element into a light beam, and wherein a passage from the light emitting element to the coupling lens is open.

2. An optical scanner according to claim 1, wherein the light shielding wall is made of metal.

3. An optical scanner according to claim 2, wherein the light shielding wall is colored so as to restrict reflection of the light beam.

4. An optical scanner according to claim 1, wherein the light shielding wall is made of resin which does not allow transmission of the light beam emitted from the light beam emission device.

5. An optical scanner according to claim 4, wherein the light shielding wall is integrally formed with a casing accommodating therein the incident optical system and the scanning optical system.

\* \* \* \* \*